(12) United States Patent
Conover (10) Patent No.: US 7,487,548 B1
(45) Date of Patent: Feb. 3, 2009

(54) GRANULAR ACCESS CONTROL METHOD AND SYSTEM

(75) Inventor: Matthew Conover, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 995 days.

(21) Appl. No.: 10/829,591

(22) Filed: Apr. 21, 2004

(51) Int. Cl.
*G06F 7/04* (2006.01)
*G06F 11/30* (2006.01)
*H04L 9/00* (2006.01)

(52) U.S. Cl. ............... 726/26; 726/27; 726/28; 726/29; 713/187; 713/189

(58) Field of Classification Search ............ None
See application file for complete search history.

(56) References Cited

U.S. PATENT DOCUMENTS

| | | | | |
|---|---|---|---|---|
| 5,615,373 | A * | 3/1997 | Ho | 710/200 |
| 5,845,280 | A * | 12/1998 | Treadwell et al. | 707/8 |
| 6,026,402 | A * | 2/2000 | Vossen et al. | 707/9 |
| 6,412,070 | B1 * | 6/2002 | Van Dyke et al. | 726/17 |
| 6,412,071 | B1 * | 6/2002 | Hollander et al. | 726/23 |
| 6,480,919 | B2 * | 11/2002 | Bonola | 710/262 |
| 6,618,735 | B1 * | 9/2003 | Krishnaswami et al. | 707/203 |
| 2002/0174359 | A1 * | 11/2002 | Haltmeyer | 713/200 |
| 2003/0023860 | A1 * | 1/2003 | Eatough et al. | 713/189 |
| 2004/0172395 | A1 * | 9/2004 | Edelstein et al. | 707/9 |

OTHER PUBLICATIONS

Dabak et al, "Hooking Windows NT System Services", copyright 1999, pp. 1-8.*

Unknown author, "Security: user mode versus kernel mode", printed on Apr. 16, 2003, pp. 1-2.*

Unknown author, "Blocking suspicious programs", printed on Apr. 16, 2003, one page.*

"Kernel-Mode Driver Architecture: Windows DDK—SeAccessCheck" Jun. 6, 2003, 2 pages. [online]. Retrieved on Nov. 21, 2003. Retrieved from the Internet:<URL:http://msdn.microsoft.com/library/en-us/kmarch/hh/kmarch/k110_42wi.asp?frame=true>. Author unknown.

"Kernel-Mode Driver Architecture: Windows DDK—ObDereferenceObject" Oct. 6, 2003, 2 pages. [online]. Retrieved on Apr. 7, 2004. Retrieved from the Internet:<URL:http://msdn.microsoft.com/library/en-us/kmarch/hh/kmarch/k107_6vg2.asp?frame=true>. Author unknown.

"Kernel-Mode Driver Architecture: Windows DDK—Object Management"Jun. 6, 2003, 1 page. [online]. Retrieved on Nov. 21, 2003. Retrieved from the Internet:<URL:http://msdn.microsoft.com/library/en-us/kmarch/hh/kmarch/objects_033b.asp?frame=true>. Author unknown.

(Continued)

*Primary Examiner*—Kimyen Vu
*Assistant Examiner*—Ponnoreay Pich
(74) *Attorney, Agent, or Firm*—Gunnison, McKay & Hodgson, L.L.P.; Serge J. Hodgson (57) ABSTRACT

A method includes stalling an attempt to reference an object, and determining whether an attempter that originated the attempt is authorized to access the object. A content-based access control list is used to determine if the attempter is authorized access to the object. This content-based access control list can be customized to protect against malicious code or other threats. Further, attempt information about the attempt can be recorded allowing profiles to be built of what a user or process is doing on a computer system.

21 Claims, 5 Drawing Sheets

OTHER PUBLICATIONS

"*Kernel-Mode Driver Architecture: Windows DDK—Object Handles*" Jun. 6, 2003, 2 pages. [online]. Retrieved on Nov. 21, 2003. Retrieved from the Internet:<URL:http://msdn.microsoft.com/library/en-us/kmarch/hh/kmarch/objects_5btz.asp?frame=true>. Author unknown.

"*Kernel-Mode Driver Architecture: Windows DDK—ObReferenceObjectByHandle*" Jun. 6, 2003, 2 pages. [online]. Retrieved on Nov. 21, 2003. Retrieved from the Internet:<URL:http://msdn.microsoft.com/library/en-us/kmarch/hh/kmarch/k107_54qa.asp?frame=true>. Author unknown.

"*Kernel-Mode Driver Architecture: Windows DDK—Life Cycle of an Object*" Jun. 6, 2003, 2 pages. [online]. Retrieved on Nov. 21, 2003. Retrieved from the Internet:<URL:http://msdn.microsoft.com/library/en-us/kmarch/hh/kmarch/objects_16av.asp?frame=true>. Author unknown.

"*Kernel-Mode Driver Architecture: Windows DDK—Object Names*" Jun. 6, 2003, 2 pages. [online]. Retrieved on Nov. 21, 2003. Retrieved from the Internet:<URL:http://msdn.microsoft.com/library.en-us/kmarch/hh/kmarch/objects_9k13asp?frame=true>. Author unknown.

Russinovich, Mark, "*Inside NT's Object Manager*", Oct. 1997, 8 pages. [online]. Retrieved on Apr. 5, 2004. Retrieved from the Internet:<URL:http://www.winntmag.com/Articles/Print.cfm?ArticleID=299>.

* cited by examiner

GRANULAR ACCESS CONTROL METHOD AND SYSTEM

BACKGROUND OF THE INVENTION

1. Field of the Invention

The present invention relates to the protection of computer systems. More particularly, the present invention relates to a system and method of monitoring and controlling access to objects.

2. Description of the Related Art

In the Windows® operating system, virtually everything is represented as an object in kernel mode. For example, files, devices, synchronization mechanisms, registry keys, threads, drivers, processes, modules, sections of memory, name pipes, mailslot, access tokens, and LPC ports are all represented as objects in kernel mode.

Access of a particular object to a particular user mode process is determined using a Windows® access control list (ACL). Specifically, when a user mode process opens or creates a resource, the object manager uses the Windows® access control list to determine if the user mode process has permission to get a handle.

If the user mode process has permission, the user mode processes receives a handle. Conversely, if the user mode process does not have permission, the user mode process is denied a handle. Without a handle, the user mode process is denied access to the object.

The user mode process is either granted complete access to the object or completely denied access. Accordingly, if granted access, the user mode process, for example, malicious code, is unrestricted as to the modifications or manipulations of the object.

SUMMARY OF THE INVENTION

In accordance with one embodiment of the present invention, a method includes stalling an attempt to reference an object, and determining whether an attempter that originated the attempt is authorized to access the object.

In one embodiment, a content-based access control list is created. This content-based access control list is used to determine if the attempter is authorized access to the object. This content-based access control list can be customized to protect against malicious code or other threats.

Upon a determination that the attempter is authorized to access the object, the method further includes saving at least part of the object. When the attempter attempts to release the object, the release attempt is stalled. If the object has changed and the attempter was not authorized to change the object, the method further comprises restoring the object with the saved at least part of the object.

In accordance with another embodiment, a method includes stalling an attempt to reference an object originating from an attempter and determining whether the attempter is being monitored. Upon a determination that the attempter is being monitored, the method further includes recording attempt information about the attempt. Illustratively, the attempt information includes the user or process from which the attempt to reference the object originated, and the object being referenced.

Using the method in accordance with this embodiment allows access to objects, e.g., Windows® objects, to be mediated allowing the behavior of a host computer system to be monitored. More particularly, access to virtually everything in Windows® such as registry, files, LPC objects, sockets, drivers, devices, memory sections, processes, threads, is monitored from both user mode and kernel mode. This enables building of profiles on what a user or process is doing on the host computer system. Building a profile is useful in understanding trojans, worms, developing behavior patterns, e.g., to determine normal vs. anomalous behavior, or categorizing risk.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
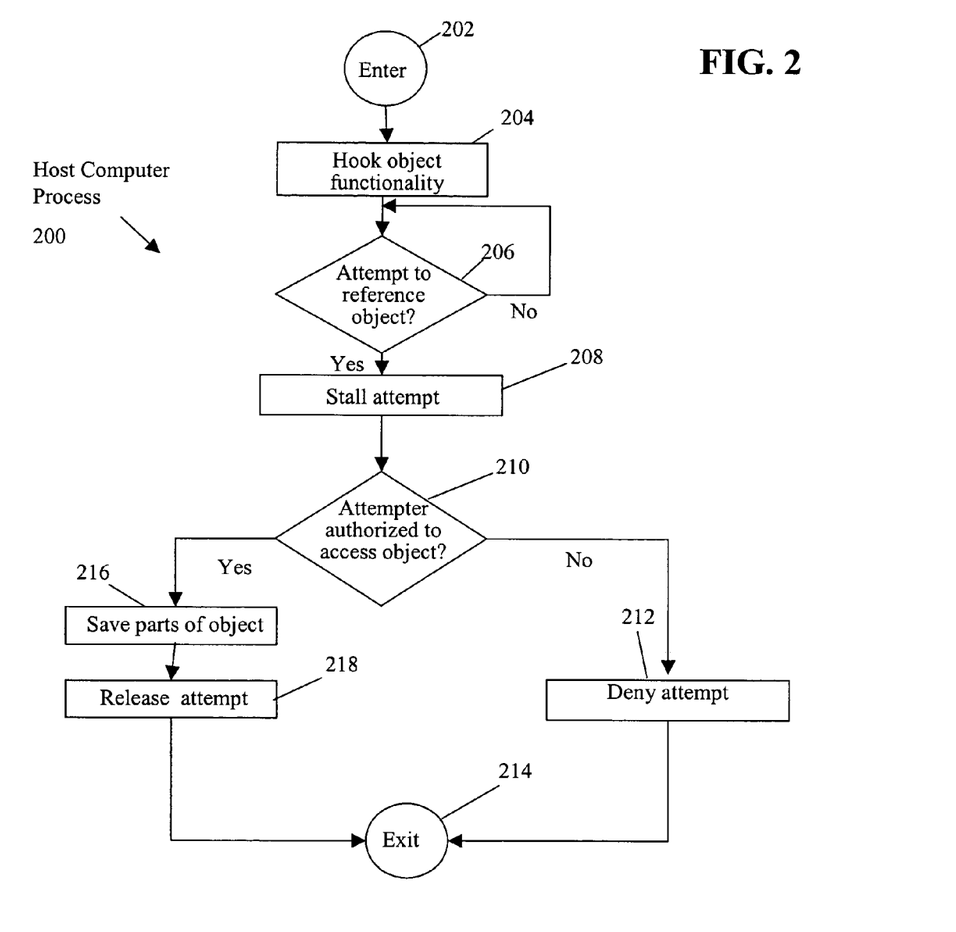
FIGS. 2, 3, 4, and 5 are flow diagrams of host computer processes in accordance with various embodiments of the present invention.

In accordance with one embodiment of the present invention, referring to FIG. 2, a method includes stalling an attempt to reference an object in a STALL ATTEMPT OPERATION 208, and determining whether an attempter that originated the attempt is authorized to access the object in an ATTEMPTER AUTHORIZED TO ACCESS OBJECT CHECK OPERATION 210.

In one embodiment, a content-based access control list is created. This content-based access control list is used to determine if the attempter is authorized access to the object. This content-based access control list can be customized to protect against malicious code or other threats.

Upon a determination that the attempter is authorized to access the object, the method further includes saving at least part of the object in a SAVE PARTS OF OBJECT OPERATION 216.

Figure 3:
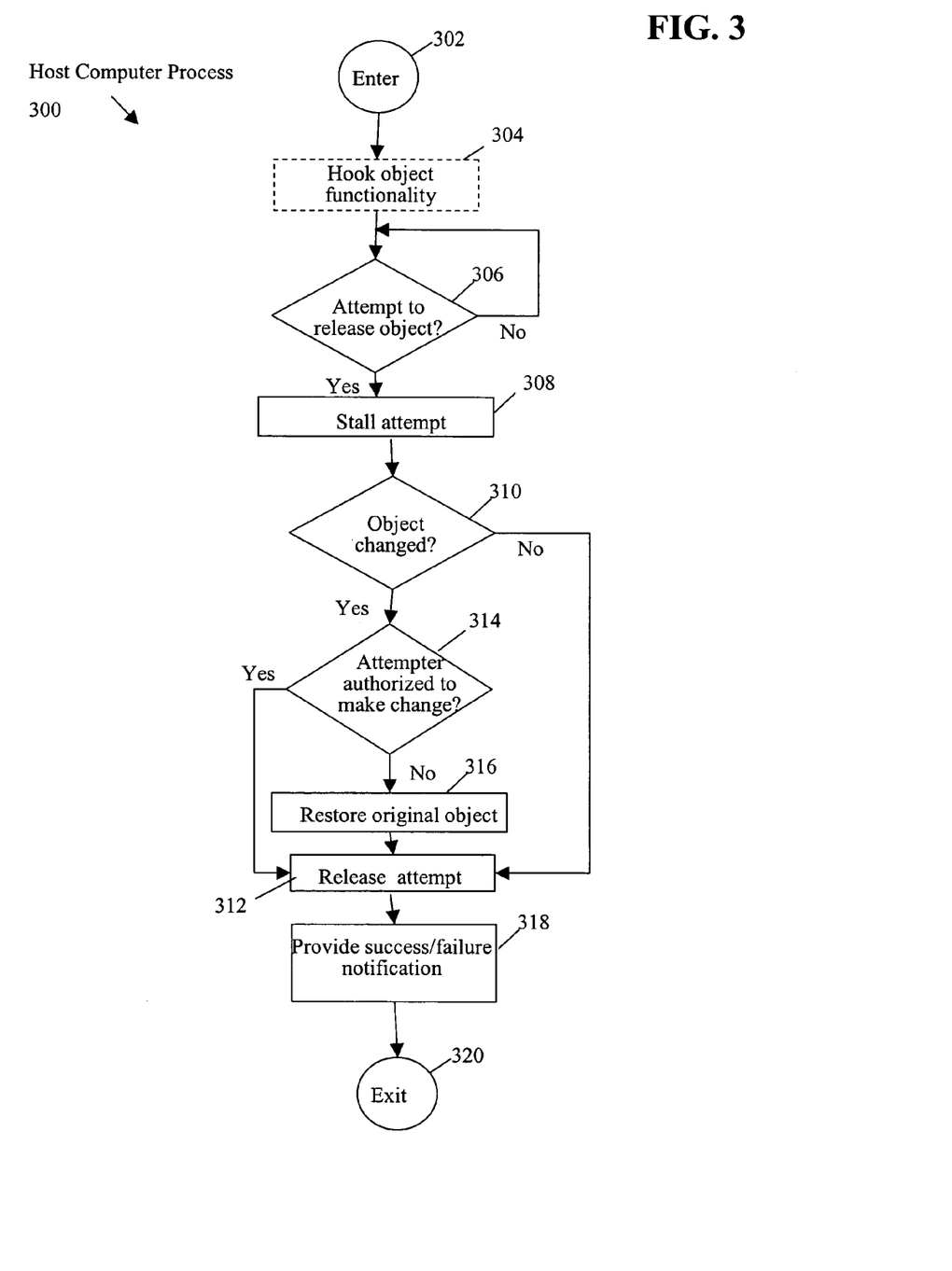

Referring now to FIG. 3, when the attempter attempts to release the object, the release attempt is stalled in a STALL ATTEMPT OPERATION 308. If the object has changed (a yes determination in OBJECT CHANGED CHECK OPERATION 310) and the attempter was not authorized to change the object (a no determination in ATTEMPTER AUTHORIZED TO MAKE CHANGE CHECK OPERATION 314), the method further includes restoring the object with the saved at least part of the object in a RESTORE ORIGINAL OBJECT OPERATION 316.

Figure 4:
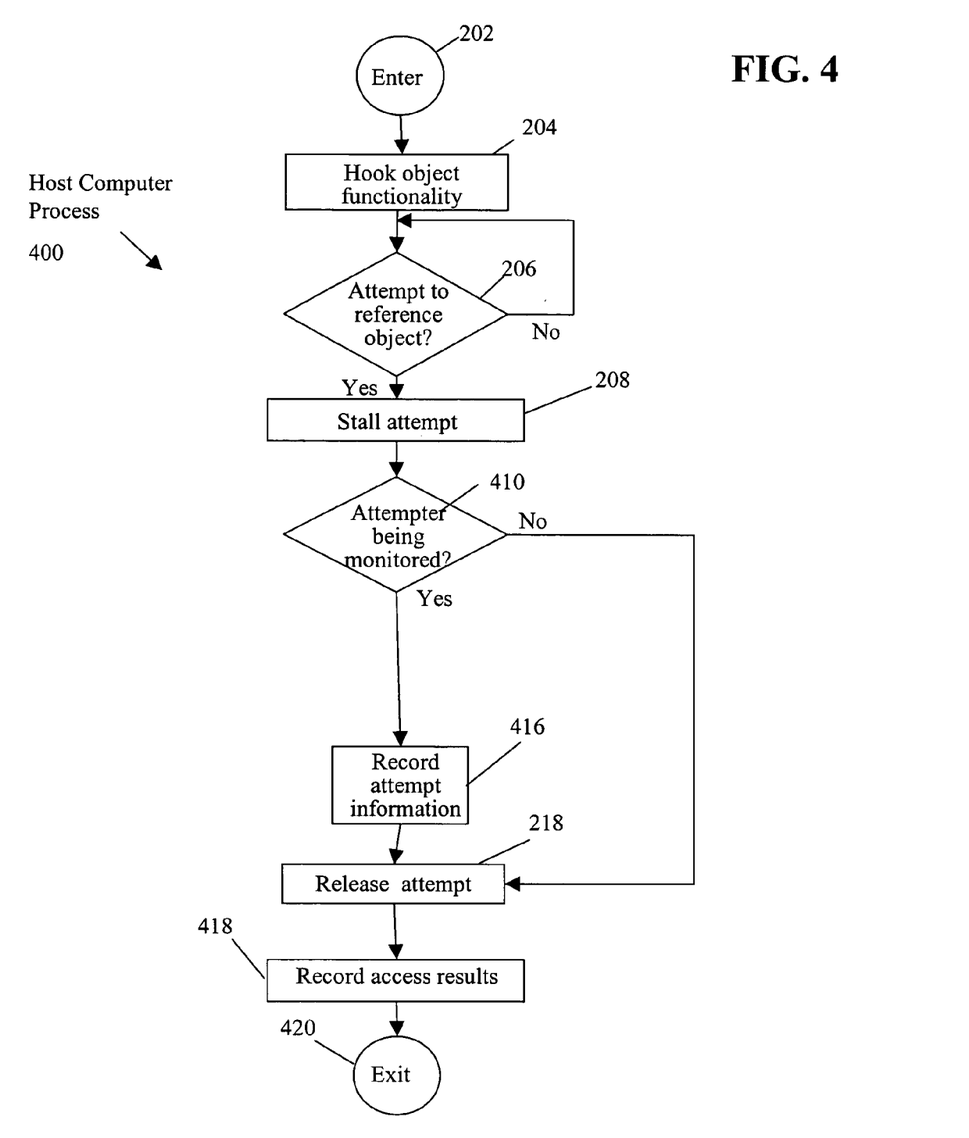

In accordance with another embodiment, referring now to FIG. 4, a method includes stalling an attempt to reference an object originating from an attempter in a STALL ATTEMPT OPERATION 208 and determining whether the attempter is being monitored in a ATTEMPTER BEING MONITORED CHECK OPERATION 410. Upon a determination that the attempter is being monitored, the method further includes recording attempt information about the attempt in a RECORD ATTEMPT INFORMATION OPERATION 416. Illustratively, the attempt information includes the user or process from which the attempt to reference the object originated, and the object being referenced.

Figure 1:
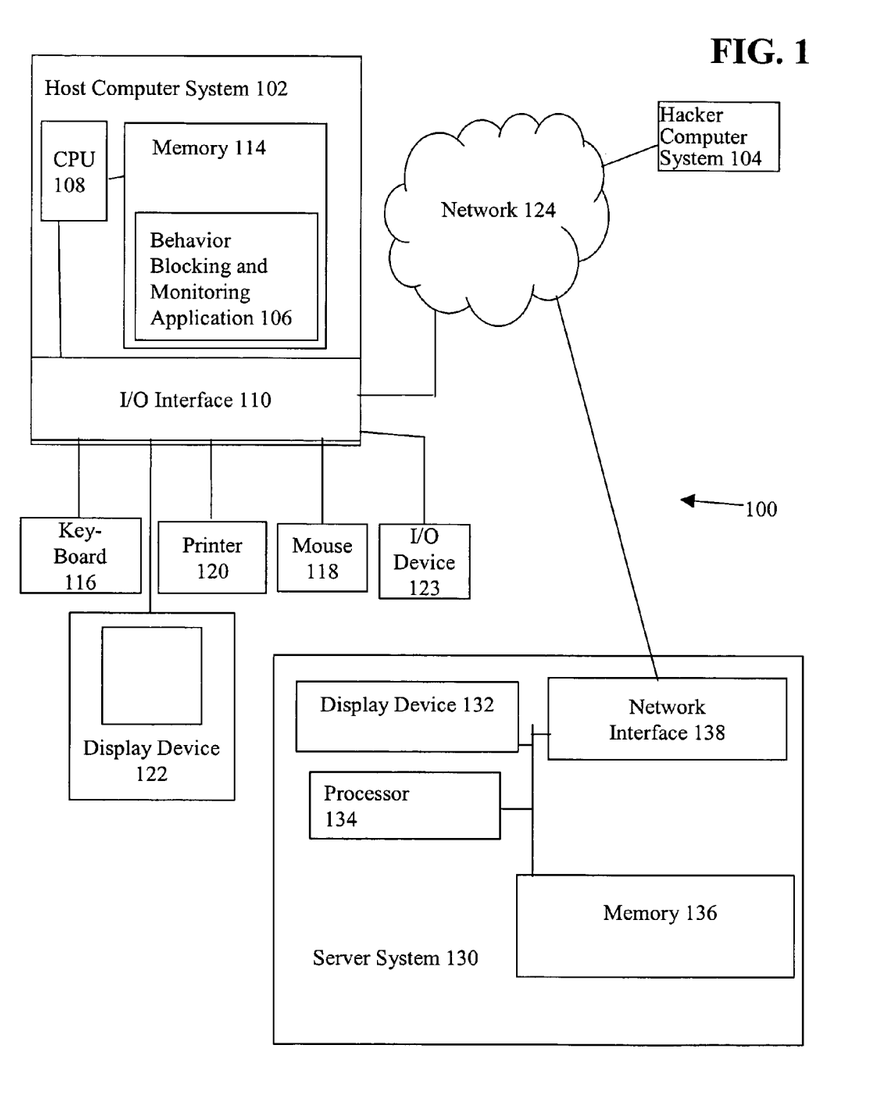
FIG. 1 is a diagram of a client-server system that includes a behavior blocking and monitoring application executing on a host computer system in accordance with one embodiment of the present invention.

More particularly, FIG. 1 is a diagram of a client-server system 100 that includes a behavior blocking and monitoring application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, behavior blocking and monitoring application 106 is loaded into host computer system 102 via I/O device 123, such as from a CD, DVD or floppy disk containing behavior blocking and monitoring application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention.

Network 124 can be any network or network system that is of interest to a user. In various embodiments, network interface 138 and I/O interface 110 include analog modems, digital modems, or a network interface card.

Behavior blocking and monitoring application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of behavior blocking and monitoring application 106 by processor 108 results in the operations of host computer process 200 as described below in one embodiment.

From an ENTER OPERATION 202, flow moves to a HOOK OBJECT FUNCTIONALITY OPERATION 204. In HOOK OBJECT FUNCTIONALITY OPERATION 204, functionality associated with creating, modifying or otherwise using, or closing an object(s), sometimes called object functionality, is hooked. Generally, object functionality is hooked by redirecting flow to hooking functionality, e.g., a hook module, in accordance with one embodiment of the present invention.

In the Windows® operating system, virtually everything is represented as an object in kernel mode. For example, files, devices, synchronization mechanisms, registry keys, threads, drivers, processes, modules, sections of memory, named pipes, mailslot, access tokens, and LPC ports are all represented as objects in kernel mode.

Objects are manipulated by the object manager. More particularly, the object manager is responsible for opening, closing, and creating objects.

When a user mode process opens or creates a resource, an object for the resource is created by the object manager, if the object is not already in existence, and a handle is returned to the user mode process from the object manager. For example, CreateFile( ) function returns a HFILE (Handle to a file) and LoadLibrary( ) function returns HMODULE (a handle to a module). Internally, Windows® looks up the object associated with the file or module, creates a reference to the object in the process's handle table, and returns a handle that represents the index into the process's handle table.

User mode processes can only manipulate objects indirectly, by using the handle, sometimes called an object handle. The handle references an entry into a process handle table for the user mode process. The handle table is a dynamically managed array that the object manager indexes via handles to locate the object that a handle refers to. Handles are process specific so two process can have different handle values for the same object.

For example, when a user mode process tries to read from a file using ReadFile( ) function, the process passes the HFILE (an index into its own handle table), which the kernel uses to reference the object using ObReferenceObjectByHandle( ) function, completes the request and returns. The user makes the changes the user desires, and calls NtClose( ) function to release the handle. Internally, NtClose( ) function calls ObDereferenceObject( ) function.

In accordance with various embodiments, object functionality is hooked in HOOK OBJECT FUNCTIONALITY OPERATION 204 at various locations between the application and the object type procedures.

In accordance with one embodiment, the user mode library is hooked in HOOK OBJECT FUNCTIONALITY OPERATION 204. More particularly, in accordance with this embodiment, the hooking functionality includes an application-specific hook between a user mode application and a user mode library, e.g., the C-library.

As is well known to those of skill in the art, a user mode library provides the functionality required to interface with the kernel, sometimes called trap to the kernel, for a user mode application. For example, instead of requiring a user mode application to create the functionality necessary to open a file, the open file functionality is provided in a user mode library available to the user mode application. Thus, to open a file, the user mode application imports the open file functionality, which is an example of an imported API function, from the user mode library.

Further, when a file is opened, a handle to an object is returned. Thus, an application-specific hook is an example of hooking object functionality.

In accordance with one embodiment, to create the application-specific hook between the user mode application and the user mode library, the function imported from the user mode library to the user mode application is modified, e.g., by inserting either a call or jump instruction, to redirect flow to hooking functionality in accordance with one embodiment of the present invention. To illustrated, continuing with the above example, the open file functionality is hooked by inserting either a call or jump instruction such that instead of invoking the open file functionality, flow is redirected to hooking functionality in accordance with one embodiment of the present invention.

An application-specific hook is specific to a user mode application. For example, a first user mode application and a second user mode application can share the same user mode library. By inserting the application-specific hook between the first user mode application and the user mode library, import function(s), i.e., object functionality, associated with the first user mode application is hooked and the second user mode application is unaffected.

In accordance with another embodiment, the system call table is hooked in HOOK OBJECT FUNCTIONALITY OPERATION 204. In one particular embodiment, all system calls utilizing handles are hooked. These system calls include NtCreateFile( ) function, NtOpenProcess( ) function, and NtClose( ) function.

As is well known to those of skill in the art, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space.

When the computer system processor is running in virtual memory mode, all addresses are assumed to be virtual addresses and are translated, or mapped, to physical addresses in main memory each time the processor executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system.

To protect the integrity of the operating system code and other kernel address space code and data structures from errant or malicious programs and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions.

A system service table, sometimes called a dispatch table or a system call table, relates system calls to specific addresses within the operating system kernel. Thus, the system call table is hooked to redirect system calls to hooking functionality in accordance with this embodiment and from the specific addresses within the operating system kernel to which the system calls would otherwise be directed.

To illustrate, when a file is opened, a system call is made which ultimately results in a handle to an object being returned. Thus, hooking the system call table is an example of hooking object functionality.

In another embodiment, the object manager, sometimes called the object handler, is hooked in HOOK OBJECT FUNCTIONALITY OPERATION 204. As is well known to those of skill in the art, the object manager is the functionality that manages all objects. Specifically, the object manager is responsible for creating, modifying or otherwise using, or closing an object including creating object types, creating and deleting objects, creating and setting object attributes, and locating objects. By hooking the object manager, virtually every aspect of Windows® can be controlled or monitored in accordance with one embodiment.

In accordance with one embodiment, the object manager provides access validation on received object handles, and if access is granted, returns the corresponding pointer to the objects body. Thus, hooking the object manager is an example of hooking object functionality. In one embodiment, either a jump or call instruction is inserted into the object manager to redirect flow to hooking functionality.

In one particular embodiment, the ObReferenceObjectByHandle( ) function is hooked in HOOK OBJECT FUNCTIONALITY OPERATION 204. For example, a jump or call instruction is inserted into the ObReferenceObjectByHandle( ) function to redirecting flow to hooking functionality, e.g., a hook module, in accordance with one embodiment of the present invention. Thus, hooking the ObReferenceObjectByHandle( ) function is an example of hooking object functionality.

In one embodiment, the ObReferenceObjectByHandle( ) function is invoked, e.g., called, upon receiving an object handle, either from a user mode application or a kernel mode application. More particularly, the ObReferenceObjectByHandle( ) function provides access validation on the object handle, and, if access can be granted, returns the corresponding pointer to the object's body. Accordingly, by hooking the ObReferenceObjectByHandle( ) function, attempts to reference an object by a user mode application or a kernel mode application are intercepted and stalled by the hooking functionality in accordance with this embodiment of the present invention.

In another particular embodiment, the ObDereferenceObject( ) function is hooked in HOOK OBJECT FUNCTIONALITY OPERATION 204. For example, a jump or call instruction is inserted into the ObDereferenceObject( ) function to redirecting flow to hooking functionality, e.g., a hook module, in accordance with one embodiment of the present invention. Thus, hooking the ObDereferenceObject( ) function is an example of hooking object functionality.

In one embodiment, the ObDereferenceObject( ) function is invoked, e.g., called, upon receiving a request to release an object, either from a user mode application or a kernel mode application. More particularly, the ObDereferenceObject( ) function decrements the given object's reference count and performs retention checks. Accordingly, by hooking the ObDereferenceObject( ) function, attempts to release an object by a user mode application or a kernel mode application are intercepted and stalled by the hooking functionality in accordance with this embodiment of the present invention.

In accordance with another embodiment, object type procedures in the object type structure of the object are hooked in HOOK OBJECT FUNCTIONALITY OPERATION 204.

As is well known to those of skill in the art, each type of object has associated object type procedures, which are called generically for all objects of that type. More particularly, when an object type is created, the object manager is passed a data structure that contains pointers to all the object type procedures. The object manager invokes, e.g., calls, these procedures when actions are required to be performed on an object of that particular type.

For example, when an object is to be closed, the object manager first calls the Okay-to-close procedure if one exists for the object type of the object. If the Okay-to-close procedure returns that it is okay to close the object, the object manager calls the close procedure for the object type of the object, which closes the object.

In accordance with one embodiment, to hook the object type procedure(s), the global object directory is access through NtOpenObjectDirectory( ) function. The object types in the ObjectTypes object directory, which is a subdirectory of the global object directory, that are to be hooked are located. For each object type, there is a set of object type procedures that are called, for example, dump, open, close, delete, parse, security, Queryname, canclose, that are located in the body of the object. Some or all of the object type procedures are hooked, for example, by inserting a jump or call instruction into the object type procedure(s) to redirecting flow to hooking functionality, e.g., a hook module, in accordance with one embodiment of the present invention. The original object type procedure is tracked to allow flow to return to the original object type procedure from the hooking functionality. Thus, hooking the object type procedure(s) is an example of hooking object functionality.

From HOOK OBJECT FUNCTIONALITY OPERATION 204, flow moves to an ATTEMPT TO REFERENCE OBJECT CHECK OPERATION 206. In ATTEMPT TO REFERENCE OBJECT CHECK OPERATION 206, a determination is made as to whether an attempt to reference an object has been made. If an attempt has not been made, flow remains at ATTEMPT TO REFERENCE OBJECT CHECK OPERATION 206. Conversely, if an attempt has been made, flow moves from ATTEMPT TO REFERENCE OBJECT CHECK OPERATION 206 to a STALL ATTEMPT OPERATION 208.

In accordance with one embodiment, an attempt to reference an object occurs when there is an attempt to create, modify or otherwise use an object. In accordance with various embodiments, an attempt to reference an object includes: (1) utilizing an imported function from a user mode library; (2) making a system call; (3) invoking the object manager; (4) invoking the ObReferenceObjectByHandle( ) function; or (5) invoking an object type procedure.

In accordance with one embodiment, an attempt includes parameters associated with the attempt. Illustratively, these parameters include the process from which the attempt originated, the credentials of the user of the process from which the attempt originated, and the object reference by the attempt.

In STALL ATTEMPT OPERATION 208, the attempt to reference the object is stalled. More particularly, to stall the attempt, flow is transferred to hooking functionality, e.g., a hook module, in accordance with one embodiment of the present invention as set forth above. In accordance with various embodiments, (1) utilization of an imported function from a user mode library is stalled; (2) a system call is stalled; (3) invoking of the object manager is stalled; (4) invoking of the ObReferenceObjectByHandle( ) function is stalled; or (5) invoking an object type procedure is stalled in STALL ATTEMPT OPERATION 208.

From STALL ATTEMPT OPERATION 208, flow moves to an ATTEMPTER AUTHORIZED TO ACCESS OBJECT CHECK OPERATION 210. In ATTEMPTER AUTHORIZED TO ACCESS OBJECT CHECK OPERATION 210, a determination is made as to whether the attempter is authorized to access the object. The attempter is the user or process from which the attempt to reference the object originated.

If a determination is made that the attempter is not authorized to access the object, flow moves from ATTEMPTER AUTHORIZED TO ACCESS OBJECT CHECK OPERATION 210 to a DENY ATTEMPT OPERATION 212. Conversely, if a determination is made that the attempter is authorized to access the object, flow moves from ATTEMPTER AUTHORIZED TO ACCESS OBJECT CHECK OPERATION 210 to a SAVE PARTS OF OBJECT OPERATION 216.

In accordance with one embodiment, an attempter is the user who uses host computer system 102. For example, a user must login or otherwise validate their identity to use host computer system 102. Examples of users include administrators and guests.

In one embodiment, a user is only allowed to make certain changes to an object and not others. For example, a section object provides direct access to physical memory and only an administrator is allowed to write to memory provided only physical pages associated with user-space are modified.

In another embodiment, a user is allowed access to an object only from certain applications. For example, if the object is a file object that the user is attempting to access, e.g., the user wants to modify a file, access is allowed only from certain applications, e.g., Microsoft Word.

In another example, an attempter is a user mode process or a kernel mode process. Access is defined based on the path to the process requesting access. For example, a user mode process wants to send e-mail and thus requires access to an object. Access is allowed only from certain applications, e.g., Microsoft outlook or lotus notes. In another embodiment, write access is granted only to process in the Windows® system directory.

In another embodiment, the referenced object is an unnamed object, e.g., the object is a non-PDO device object. As is well known to those of skill in the art, an unnamed object inherits the setting for its parent object or for its object type. However, in accordance with this embodiment, access to the unnamed object can be defined specifically for the unnamed object. Thus, access to the unnamed object can be different than the setting for its parent object or for its object type.

In one embodiment, a content-based access control list is created. This content-based access control list is used to determine if an attempter is authorized access to an object in ATTEMPTER AUTHORIZED TO ACCESS OBJECT CHECK OPERATION 210. This content-based access control list can be customized to protect against malicious code or other threats. In one embodiment, malicious code is defined as any computer program, module, set of modules, or code that enters a computer system without an authorized user's knowledge and/or without an authorized user's consent.

Illustrative examples of records of a content-based access control list are set forth as follows.

(1) Accept or deny: operation: object type : users it applies to: field: conditions deny: write: LPC:*: LPC.PID,LPC.TID:*

Prevent anyone from changing the PID or TID of LPC messages. This has no preconditions.

(2) deny: write: FILE: Administrator: FILE.CreationFile:*

Prevent anyone other than the administrator of changing the creation time. This has no preconditions.

(3) deny: write: SECTION:*:*: SECTION.Name="\Device\PhysicalMemory"

Prevent any modifications to physical memory through the "\Device\PhysicalMemory" section object. The precondition is that the SECTION object being modified is named "\Device\PhysicalMemory."

Although particular examples are provided, in light of this disclosure, those of skill in the art will understand that any one of a number of access rules can be created to control access to objects.

As set forth above, upon a determination that the user is not authorized to access the object, flow moves from ATTEMPTER AUTHORIZED TO ACCESS OBJECT CHECK OPERATION 210 to DENY ATTEMPT OPERATION 212. In DENY ATTEMPT OPERATION 212, the attempt to reference the object is denied. In accordance with one embodiment, the attempt to reference the object is denied by terminating the attempt. Optionally, an error status is returned as part of the denial.

From DENY ATTEMPT OPERATION 212, flow moves to and exits at an EXIT OPERATION 214 or returns to ATTEMPT TO REFERENCE OBJECT CHECK OPERATION 206, and waits for the next attempt to reference an object.

Returning again to ATTEMPTER AUTHORIZED TO ACCESS OBJECT CHECK OPERATION 210, upon a determination that the attempter is authorized to access the object, flow moves from ATTEMPTER AUTHORIZED TO ACCESS OBJECT CHECK OPERATION 210 to SAVE PARTS OF OBJECT OPERATION 216.

In SAVE PARTS OF OBJECT OPERATION 216, part or all, e.g., at least part, of the object is saved. By saving part or all of the object, the original state of the part or all of the object is preserved. As discussed further below, the saved part or all of the object is used for a comparison in an OBJECT CHANGED OPERATION CHECK OPERATION 310 (FIG. 3) and RESTORE ORIGINAL OBJECT OPERATION 316.

In one embodiment, the object is an access token and only the source of the token is saved. By only saving part of the object, less time and memory area is required compared to saving all of the object.

From SAVE PARTS OF OBJECT OPERATION 216, flow moves to a RELEASE ATTEMPT OPERATION 218. In RELEASE ATTEMPT OPERATION 218, the attempt is released. Recall the attempt was stalled in STALL ATTEMPT OPERATION 208. In accordance with various embodiments, (1) utilization of an imported function from a user mode library is released; (2) a system call is released; (3) invoking of the object manager is released; (4) invoking of the ObReferenceObjectByHandle( ) function is released; or (5) invoking an object type procedure is released in released attempt operation 218. Upon releasing the attempt, the attempt is passed to the original object functionality from which the attempt was redirected.

In one particular embodiment, upon release of the attempt in RELEASE ATTEMPT OPERATION 218, the ObReferenceObjectByHandle( ) function is invoked. Upon being invoked, the ObReferenceObjectByHandle( ) function determines whether access is granted to the object using a standard access control list (ACL) provided by the Windows® operating system. Accordingly, access can be granted or denied by the ObReferenceObjectByHandle( ) function using the Windows® access control list.

Thus, host computer process 200 in accordance with this embodiment of the present invention is completely compatible with the standard Windows® access control list. More particularly, host computer process 200 provides an additional layer of protection to the standard Windows® access control list instead of replacing it.

From RELEASE ATTEMPT OPERATION 218, flow moves to and exits at an EXIT OPERATION 214 or returns to ATTEMPT TO REFERENCE OBJECT CHECK OPERATION 206, and waits for the next attempt to reference an object.

FIG. 3 is a flow diagram of a host computer process 300 in accordance with one embodiment of the present invention. Referring now to FIGS. 1 and 3 together, execution of behavior blocking and monitoring application 106 by processor 108 results in the operations of host computer process 300 as described below in one embodiment.

From an ENTER OPERATION 302, flow moves to an optional HOOK OBJECT FUNCTIONALITY OPERATION 304. In HOOK OBJECT FUNCTIONALITY OPERATION 304, functionality associated with creating, modifying or otherwise using, or closing an object(s), sometimes called object functionality, is hooked. HOOK OBJECT FUNCTIONALITY OPERATION 304 is identical or similar to HOOK OBJECT FUNCTIONALITY OPERATION 204 of FIG. 2. Further, if HOOK OBJECT FUNCTIONALITY OPERATION 204 has already been performed and objected functionality hooked, HOOK OBJECT FUNCTIONALITY OPERATION 304 is not performed and thus is an optional operation.

From HOOK OBJECT FUNCTIONALITY OPERATION 304 (or directly from ENTER OPERATION 302 if HOOK OBJECT FUNCTIONALITY OPERATION 304 is not performed), flow moves to an ATTEMPT TO RELEASE OBJECT CHECK OPERATION 306. In ATTEMPT TO RELEASE OBJECT CHECK OPERATION 306, a determination is made as to whether an attempt to release an object has been made. If an attempt has not been made, flow remains at ATTEMPT TO RELEASE OBJECT CHECK OPERATION 306. Conversely, if an attempt has been made, flow moves from ATTEMPT TO RELEASE OBJECT CHECK OPERATION 306 to a STALL ATTEMPT OPERATION 308.

In accordance with one embodiment, an attempt to release an object occurs when there is an attempt to close or delete an object. In accordance with various embodiments, an attempt to release an object includes: (1) utilizing an imported function from a user mode library; (2) making a system call; (3) invoking the object manager; (4) invoking the ObDereferenceObject( ) function; or (5) invoking an object type procedure.

In accordance with one embodiment, an attempt includes parameters associated with the attempt. Illustratively, these parameters include the process from which the attempt originated, the credentials of the user of the process from which the attempt originated, and the object referenced by the attempt.

In STALL ATTEMPT OPERATION 308, the attempt to release the object is stalled. More particularly, to stall the attempt, flow is transferred to hooking functionality in accordance with one embodiment as set forth above. In accordance with various embodiments, (1) utilization of an imported function from a user mode library is stalled; (2) a system call is stalled; (3) invoking of the object manager is stalled; (4) invoking the ObDereferenceObject( ) function is stalled; or (5) invoking an object type procedure is stalled in STALL ATTEMPT OPERATION 308.

From STALL ATTEMPT OPERATION 308, flow moves to an OBJECT CHANGED CHECK OPERATION 310. In OBJECT CHANGED CHECK OPERATION 310, a determination is made as to whether the object has changed. More particularly, a determination is made as to whether the attempter has changed the object in OBJECT CHANGED CHECK OPERATION 310. In one embodiment, the determination as to whether the object has changed is performed by comparing the part or all of the object being release to the saved part or all of the object as preserved in its original form. Recall that part or all of the object was saved in SAVE PARTS OF OBJECT OPERATION 216 (FIG. 2) to preserve the part or all of the object in its original form.

If a determination is made that the object has not change, flow moves from OBJECT CHANGED CHECK OPERATION 310 to a RELEASE ATTEMPT OPERATION 312. In RELEASE ATTEMPT OPERATION 312, the attempt is released. Recall the attempt was stalled in STALL ATTEMPT OPERATION 308. In accordance with various embodiments, (1) utilization of an imported function from a user mode library is released; (2) a system call is released; (3) invoking of the object manager is released; (4) invoking the ObDereferenceObject( ) function is released; or (5) invoking an object type procedure is released in released attempt operation 312.

Returning again to OBJECT CHANGED CHECK OPERATION 310, if a determination is made that the object has changed, flow moves to an ATTEMPTER AUTHORIZED TO MAKE CHANGE CHECK OPERATION 314. In ATTEMPTER AUTHORIZED TO MAKE CHANGE CHECK OPERATION 314, a determination is made as to whether the attempter is authorized to make the change to the object.

If a determination is made that the attempter is authorized to make the change to the object, flow moves from ATTEMPTER AUTHORIZED TO MAKE CHANGE CHECK OPERATION 314 to RELEASE ATTEMPT OPERATION 312, which is performed as discussed above. Conversely, if a determination is made that the attempter is not authorized to make the change to the object, flow moves from ATTEMPTER AUTHORIZED TO MAKE CHANGE CHECK OPERATION 314 to a RESTORE ORIGINAL OBJECT OPERATION 316.

In RESTORE ORIGINAL OBJECT OPERATION 316, the parts or all of the original object is restored. Recall that the parts or all of the original object were saved in SAVE PARTS OF OBJECT OPERATION 216 (FIG. 2). More particularly, the part or all of the object that the attempter was not authorized to change are restored in RESTORE ORIGINAL OBJECT OPERATION 316.

In one example, with a file object, a user is allowed to change the modification time of the object but not the creation time. In accordance with this example, if the modification time, the creation time, or both have been changed by the user, a determination is made in OBJECT CHANGED CHECK OPERATION 310 that the user, i.e., attempter, has changed the object.

Accordingly, flow moves to ATTEMPTER AUTHORIZED TO MAKE CHANGE CHECK OPERATION 314. If the user only changed the modification time of the file object, a determination is made that the user was authorized to make the change, and the attempt is released in RELEASE ATTEMPT OPERATION 312.

Conversely, if the user only changed the creation time of the file object, a determination is made that the user was not authorized to make the change, and the file object is restored with the original creation time.

In another example, if the user changed both the creation time and the modification time of the file object, a determination is made that the user was not authorized to make the change to the creation time but was authorized to change the modification time. Because the user made an unauthorized change, flow moves to RESTORE ORIGINAL OBJECT OPERATION 316, and the file object is restored with the original creation time. However, because the user was authorized to change the modification time, the modification time of the file object is not restored.

Thus, the user is restricted from performing restricted changes to the object, while allowed to make permitted changes to the object. In accordance with one embodiment, dangerous behaviors, e.g., by malicious code, can be prevented.

Although particular examples are provided, in light of this disclosure, those of skill in the art will understand that any one of a number of object change rules can be created to control the ability of users and processes to change objects.

From RELEASE ATTEMPT OPERATION 312, flow moves to a PROVIDE SUCCESS/FAILURE NOTIFICATION OPERATION 318. In PROVIDE SUCCESS/FAILURE NOTIFICATION OPERATION 318, a notification is provided, e.g., to the user, about whether parts or all of the released object were restored. More particularly, if RESTORE ORIGINAL OBJECT OPERATION 316 was performed, a notification is provided that part or all of the released object was restored, e.g., an error message is returned. Conversely, if RESTORE ORIGINAL OBJECT OPERATION 316 was not performed, a notification is provided that the object was released without restoration, e.g., a success message is returned.

From PROVIDE SUCCESS/FAILURE NOTIFICATION OPERATION 318, flow moves to and exits at an EXIT OPERATION 320 or returns to ATTEMPT TO RELEASE OBJECT CHECK OPERATION 306, and waits for the next attempt to release an object.

FIG. 4 is a flow diagram of a host computer process 400 in accordance with one embodiment of the present invention. Referring now to FIGS. 1 and 4 together, execution of behavior blocking and monitoring application 106 by processor 108 results in the operations of host computer process 400 as described below in one embodiment.

Referring now to FIGS. 2 and 4 together, ENTER OPERATION 202, HOOK OBJECT FUNCTIONALITY OPERATION 204, ATTEMPT TO REFERENCE OBJECT CHECK OPERATION 206, and STALL ATTEMPT OPERATION 208 of host computer process 400 are the same or similar to ENTER OPERATION 202, HOOK OBJECT FUNCTIONALITY OPERATION 204, ATTEMPT TO REFERENCE OBJECT CHECK OPERATION 206, and STALL ATTEMPT OPERATION 208 of host computer process 200 and so are not repeated for clarity of discussion.

Referring now to FIG. 4, from STALL ATTEMPT OPERATION 208, flow moves to an ATTEMPTER BEING MONITORED CHECK OPERATION 410. In ATTEMPTER BEING MONITORED CHECK OPERATION 410, a determination is made as to whether the attempter, e.g., a user or process, that originated the attempt to reference the object is being monitored.

For example, the processor mode is checked to determine if the attempter is a user mode process or a kernel mode process. If the attempter is a kernel mode process, in one embodiment, the access is considered safe and a determination is made that the attempter is not being monitored. Further, if the attempter is a user mode process, the determination of whether the attempter is being monitored is made on the basis of the process owner in one embodiment. For example, if the process owner is an administrator, the access is considered safe and a determination is made that the attempter is not being monitored. Conversely, if the process owner is a guest, the access is considered possibly unsafe and a determination is made that the attempter is being monitored. In yet another embodiment, the process ID (PID) is used to determine if the attempter is being monitored.

If a determination is made that the attempter is not being monitored, flow moves to RELEASE ATTEMPT OPERATION 218, and the attempt to reference the object is released. RELEASE ATTEMPT OPERATION 218 of host computer process 400 (FIG. 4) is the same as or similar to RELEASE ATTEMPT OPERATION 218 of host computer process 200 (FIG. 2) and so is not repeated for clarity of discussion.

Conversely, if a determination is made that the attempter is being monitored, flow moves from ATTEMPTER BEING MONITORED CHECK OPERATION 410, to a RECORD ATTEMPT INFORMATION OPERATION 416. In RECORD ATTEMPT INFORMATION OPERATION 416, attempt information about the attempt to reference the object is recorded. Illustratively, the attempt information includes the user or process from which the attempt to reference the object originated, and the object being referenced.

From RECORD ATTEMPT INFORMATION OPERATION 416, flow moves to RELEASE ATTEMPT OPERATION 218, which is performed as discussed above.

In one particular embodiment, upon release of the attempt in RELEASE ATTEMPT OPERATION 218, the ObReferenceObjectByHandle( ) function is invoked. Upon being invoked, the ObReferenceObjectByHandle( ) function determines whether access is granted to the object using a standard Windows® access control list (ACL). Accordingly, access can be granted or denied by the ObReferenceObjectByHandle( ) function using the standard Windows® access control list.

From RELEASE ATTEMPT OPERATION 218, flow moves to a RECORD ACCESS RESULTS OPERATION 418. In RECORD ACCESS RESULTS OPERATION 418, the results of the access to the object, i.e., whether access to the object is granted or denied, are recorded. More particularly, whether access was granted or denied by the ObReferenceObjectByHandle( ) function using the standard Windows® access control list (ACL) is recorded.

From RECORD ACCESS RESULTS OPERATION 418, flow moves to and exits at an EXIT OPERATION 420 or returns to ATTEMPT TO REFERENCE OBJECT CHECK OPERATION 206, and waits for the next attempt to reference an object.

Figure 5:
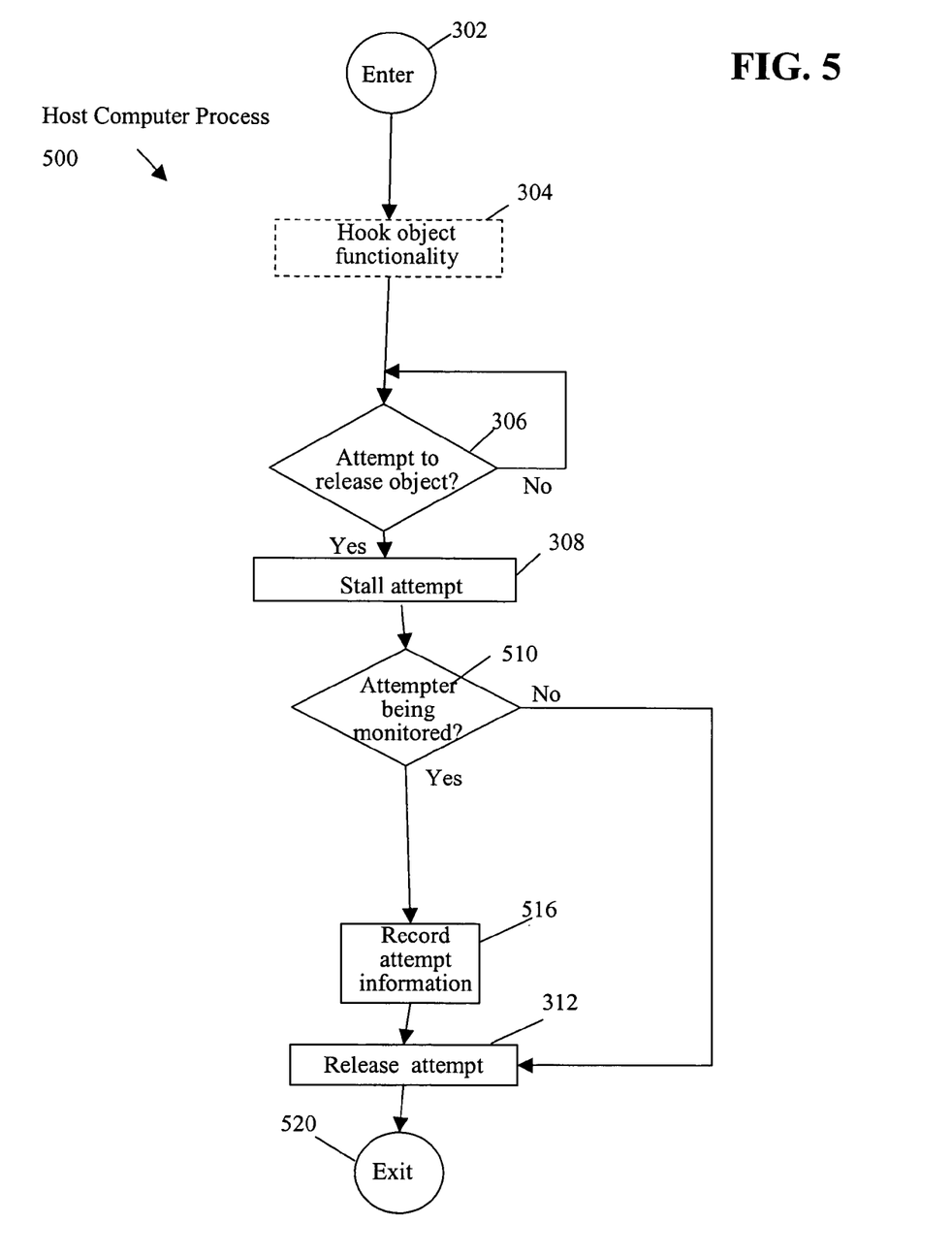

FIG. 5 is a flow diagram of a host computer process 500 in accordance with one embodiment of the present invention. Referring now to FIGS. 1 and 5 together, execution of behavior blocking and monitoring application 106 by processor 108 results in the operations of host computer process 500 as described below in one embodiment.

Referring now to FIGS. 3 and 5 together, ENTER OPERATION 302, HOOK OBJECT FUNCTIONALITY OPERATION 304, ATTEMPT TO RELEASE OBJECT CHECK OPERATION 306, and STALL ATTEMPT OPERATION 308 of host computer process 500 are the same or similar to ENTER OPERATION 302, HOOK OBJECT FUNCTIONALITY OPERATION 304, ATTEMPT TO RELEASE OBJECT CHECK OPERATION 306, and STALL ATTEMPT OPERATION 308, respectively, of host computer process 300 and so are not repeated for clarity of discussion.

Referring now to FIG. 5, from STALL ATTEMPT OPERATION 308, flow moves to an ATTEMPTER BEING MONITORED CHECK OPERATION 510. In ATTEMPTER BEING MONITORED CHECK OPERATION 510, a determination is made as to whether the attempter that originated the attempt to release the object is being monitored.

If a determination is made that the attempter is not being monitored, flow moves to RELEASE ATTEMPT OPERATION 312, and the attempt to release the object is released. RELEASE ATTEMPT OPERATION 312 of host computer process 500 (FIG. 5) is the same as or similar to RELEASE ATTEMPT OPERATION 312 of host computer process 300 (FIG. 3) and so is not repeated for clarity of discussion.

Conversely, if a determination is made that the attempter is being monitored, flow moves from ATTEMPTER BEING MONITORED CHECK OPERATION 510, to a RECORD ATTEMPT INFORMATION OPERATION 516. In RECORD ATTEMPT INFORMATION OPERATION 516, attempt information about the attempt to release the object is recorded. Illustratively, the attempt information includes the user or process from which the attempt to release the object originated, and the object being released.

From RECORD ATTEMPT INFORMATION OPERATION 516, flow moves to RELEASE ATTEMPT OPERATION 312, which is performed as discussed above.

From RELEASE ATTEMPT OPERATION 312, flow moves to and exits at an EXIT OPERATION 520 or returns to ATTEMPT TO RELEASE OBJECT CHECK OPERATION 306, and waits for the next attempt to release an object.

In the above manner, by using host computer process 400 and/or host computer process 500, access to objects, e.g., Windows® objects, is mediated allowing the behavior of host computer system 102 to be monitored. More particularly, by using host computer process 400 and/or host computer process 500, access to virtually everything in Windows® such as registry, files, LPC objects, sockets, drivers, devices, memory sections, processes, threads, is monitored from both user mode and kernel mode. In one embodiment, host computer process 400 and/or host computer process 500 are used with Symantec's Host Intrusion Detection System (HIDS).

Further, by using host computer process 400 and/or host computer process 500, a profile can be built of what a user or process is doing on host computer system 102. Building a profile is useful in understanding trojans, worms, developing behavior patterns, e.g., to determine normal vs. anomalous behavior, or categorizing risk, e.g., a process can be categorized as high-risk because it is using socket operations.

Referring again to FIG. 1, behavior blocking and monitoring application 106 is in computer memory 114. As used herein, a computer memory refers to a volatile memory, a non-volatile memory, or a combination of the two.

Although behavior blocking and monitoring application 106 is referred to as an application, this is illustrative only. Behavior blocking and monitoring application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, behavior blocking and monitoring application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the behavior blocking and monitoring functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the behavior blocking and monitoring functionality in accordance with one embodiment of the present invention can be implemented in a wide variety of computer system configurations. In addition, the behavior blocking and monitoring functionality could be stored as different modules in memories of different devices. For example, behavior blocking and monitoring application 106 could initially be stored in server system 130, and then as necessary, a portion of behavior blocking and monitoring application 106 could be transferred to host computer system 102 and executed on host computer system 102. Consequently, part of the behavior blocking and monitoring functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, behavior blocking and monitoring application 106 is stored in memory 136 of server system 130. Behavior blocking and monitoring application 106 is transferred over network 124 to memory 114 in host computer system 102. In this embodiment, network interface 138 and I/O interface 110 would include analog modems, digital modems, or a network interface card. If modems are used, network 124 includes a communications network, and behavior blocking and monitoring application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   stalling an attempt to reference an object;
   determining whether an attempter that originated said attempt is authorized to access said object, wherein upon a determination that said attempter is authorized to access said object, said method further comprising saving at least part of said object;
   stalling an attempt to release said object;
   determining whether said object has changed, wherein upon a determination that said object has changed, said method further comprising determining if said attempter is authorized to change said object; and
   wherein upon a determination that said attempter is authorized to change said object, said method further comprising releasing said attempt to release said object.

2. The method of claim 1 wherein upon a determination that said attempter is authorized to access said object, said method further comprising releasing said attempt to reference said object.

3. The method of claim 2 wherein upon said releasing said attempt to reference said object, said method further comprising determining if access is granted using an access control list.

4. The method of claim 1 wherein upon a determination that said attempter is not authorized to access said object, said method further comprising denying said attempt to reference said object.

5. The method of claim 1 further comprising hooking object functionality.

6. The method of claim 5 wherein said object functionality comprises functionality associated with creating, modifying, or closing said object.

7. The method of claim 5 wherein said hooking object functionality comprises hooking a user mode library.

8. The method of claim 5 wherein said hooking object functionality comprises hooking a system call table.

9. The method of claim 5 wherein said hooking object functionality comprises hooking an object manager.

10. The method of claim 5 wherein said hooking object functionality comprises hooking object type procedures.

11. The method of claim 1 further comprising determining whether said attempt to reference an object has occurred.

12. The method of claim 1 wherein upon a determination that said object has not changed, said method further comprising releasing said attempt to release said object.

13. The method of claim 1 wherein upon a determination that said attempter is not authorized to change said object, said method further comprising restoring said object.

14. The method of claim 13 wherein said restoring comprises replacing at least part of said object with a saved at least part of said object.

15. The method of claim 1 further comprising:
   determining that said attempter did not have authority to change said object;
   restoring said object comprising:
      restoring a restricted change to said object made by said attempter, wherein said attempter is not authorized to make said restricted change; and
      allowing a permitted change to said object made by said attempter, wherein said attempter is authorized to make said permitted change; and
   releasing said attempt to release said object.

16. The method of claim 1 wherein said attempter is a user of a computer system.

17. The method of claim 1 wherein said attempter is a process on a computer system.

18. The method of claim 17 wherein said process is a kernel mode process.

19. A system comprising:
   a memory;
   a means for stalling an attempt to reference an object;
   a means for determining whether an attempter that originated said attempt is authorized to access said object;
   a means for saving at least part of said object upon a determination that said attempter is authorized to access said object;
   a means for stalling an attempt to release said object;
   a means for determining whether said object has changed;
   a means for determining if said attempter is authorized to change said object upon a determination that said object has changed; and
   a means for releasing said attempt to release said object upon a determination that said attempter is authorized to change said object.

20. A computer-program product comprising a tangible computer-readable storage medium containing computer program code comprising:
   a behavior blocking and monitoring application that stalls an attempt to reference an object;
   said behavior blocking and monitoring application further determining whether an attempter that originated said attempt is authorized to access said object, wherein upon a determination that said attempter is authorized to access said object, said behavior blocking and monitoring application further saving at least part of said object;

said behavior blocking and monitoring application further stalling an attempt to release said object;

said behavior blocking and monitoring application further determining whether said object has changed, wherein upon a determination that said object has changed, said behavior blocking and monitoring application further determining if said attempter is authorized to change said object; and said behavior blocking and monitoring application releasing said attempt to release said object upon a determination that said attempter is authorized to change said object.

21. A computer system comprising:

a memory having stored therein a behavior blocking and monitoring application; and a processor coupled to said memory, wherein execution of said behavior blocking and monitoring application generates a method comprising:

stalling an attempt to reference an object;

determining whether an attempter that originated said attempt is authorized to access said object, wherein upon a determination that said attempter is authorized to access said object, said method further comprising saving at least part of said object;

stalling an attempt to release said object;

determining whether said object has changed, wherein upon a determination that said object has changed, said method further comprising determining if said attempter is authorized to change said object; and wherein upon a determination that said attempter is authorized to change said object, said method further comprising releasing said attempt to release said object.

\* \* \* \* \*